(12) United States Patent
Salam et al.

(10) Patent No.: US 11,717,804 B1
(45) Date of Patent: Aug. 8, 2023

(54) MODIFIED NANOCLAY FOR HEAVY METAL AND SALT REMOVAL FROM WATER

(71) Applicant: King Abdulaziz University, Jeddah (SA)

(72) Inventors: Mohamed Abdel Salam, Jeddah (SA); Radwan K. Al-Farawati, Jeddah (SA); Naif Salama Aljohani, Jeddah (SA); Ibrahim I. Shabbaj, Jeddah (SA)

(73) Assignee: KING ABDULAZIZ UNIVERSITY, Jeddah (SA)

( * ) Notice: Subject to any disclaimer, the term of this patent is extended or adjusted under 35 U.S.C. 154(b) by 0 days.

(21) Appl. No.: 17/987,915

(22) Filed: Nov. 16, 2022

(51) Int. Cl.
B01J 20/22 (2006.01)
B01J 20/12 (2006.01)
C02F 1/28 (2023.01)
C02F 101/20 (2006.01)

(52) U.S. Cl.
CPC ............... *B01J 20/22* (2013.01); *B01J 20/12* (2013.01); *C02F 1/288* (2013.01); *C02F 1/281* (2013.01); *C02F 1/285* (2013.01); *C02F 2101/203* (2013.01); *C02F 2209/06* (2013.01); *C02F 2303/16* (2013.01)

(58) Field of Classification Search
None
See application file for complete search history.

(56) References Cited

U.S. PATENT DOCUMENTS

| | | | | |
|---|---|---|---|---|
| 4,353,916 | A * | 10/1982 | Uematsu | C07D 263/58 514/367 |
| 5,277,896 | A * | 1/1994 | Balkus, Jr. | A61K 49/1893 514/836 |
| 11,519,076 | B2 * | 12/2022 | Bassi | C23F 11/181 |
| 2009/0060808 | A1 | 3/2009 | Baum et al. | |
| 2009/0078153 | A1 * | 3/2009 | Shchukin | C09D 7/68 106/14.44 |
| 2011/0033436 | A1 * | 2/2011 | Chen | A01N 63/22 424/93.46 |
| 2011/0297038 | A1 * | 12/2011 | Lvov | C09D 7/67 523/466 |
| 2020/0054022 | A1 * | 2/2020 | Ward | A01N 43/40 |
| 2020/0123025 | A1 * | 4/2020 | El-Masri | B01J 20/28007 |
| 2021/0139717 | A1 * | 5/2021 | Ueno | C09D 7/67 |
| 2021/0353814 | A1 * | 11/2021 | Fields | A61Q 13/00 |

OTHER PUBLICATIONS

Aljohani et al., "Environmental Remediation of Desalination Plant Outfall Brine Discharge from Heavy Metals and Salinity Using Halloysite Nanoclay", Water, Mar. 31, 2021, 13, 969.

Cavallaro et al., "Organic-nanoclay composite materials as removal agents for environmental decontamination", RSC Adv., 2019, 9, 40553.

(Continued)

*Primary Examiner* — Chester T Barry
(74) *Attorney, Agent, or Firm* — WCF IP

(57) ABSTRACT

An 8-hydroxyquinoline modified halloysite nanoclay (8-HQHNC) is provided. The 8-HQHNC is used in a method of removing heavy metals and/or salt from a solution which includes steps of contacting the solution with 8-HQHNC under conditions suitable for the adsorption of the heavy metals and/or salt to the 8-HQHNC and recovering the 8-HQHNC from the solution.

7 Claims, 2 Drawing Sheets

(56) References Cited

OTHER PUBLICATIONS

Covaliu et al., "Halloysite nanotube applications for heavy metals removal from wastewater", E3S Web of Conferences 112, 04010 (2019).

Kosa et al., "Removal of heavy metals from aqueous solutions by multi-walled carbon nanotubes modified with 8-hydroxyquinoline", Chemical Engineering Journal, vols. 181-182, Feb. 1, 2012, pp. 159-168.

Jinhua et al., "Rapid adsorption of Cr (VI) on modified halloysite nanotubes", Desalination 259 (2010) 22-28.

Saif et al., "Properties and Modification Methods of Halloysite Nanotubes: a State-of-the-Art Review", J. Chil. Chem. Soc., 63, No. 3 (2018).

* cited by examiner

MODIFIED NANOCLAY FOR HEAVY METAL AND SALT REMOVAL FROM WATER

FIELD OF THE INVENTION

The invention is generally related to 8-hydroxyquinoline modified halloysite nanoclay and its use for removing heavy metals and/or salt from wastewater.

BACKGROUND OF THE INVENTION

Freshwater resource scarcity is a major problem for many countries worldwide. The United Nations (UN) report (Environment Program) has demonstrated that one-third of the world's population has insufficient freshwater [1]. At the same time, 97.5 percent of the Earth's water is found in the oceans and seas [2,3]. The salinity range in seawater is 35,000-45,000 ppm [4-7], but the permissible salinity level in drinking water is 500 ppm and up to 1000 ppm for special cases [8]. This shows the necessity of desalination plants in the present era. The desalination plants discharge effluents (brine) are characterized by the presence of high salinity and high heavy metal contents which usually lead to contamination of the marine environment in the vicinity of desalination plants [9]. The current brine remediation process is mostly based on the discharge of the brine into the water bodies, i.e., the sea, and oceans, or to the land. This creates many environmental problems including the disturbance of the aquatic system balance and damage to the fauna and flora around the desalination plants [10]. In addition, the presence of heavy metal ions, such as zinc, iron, nickel, and copper in the aquatic environment, even at low concentrations, might cause a serious issue due to their toxicity and carcinogenicity to living organisms.

Although elements like copper and zinc are essential for living organisms, like all heavy metals, they are harmful at excess concentrations, as excess of zinc ions could cause vomiting, nausea, and hematemesis, whereas excess of copper ions could cause Wilson's disease [11]. Nickel ions could cause cancer [12], and a long-term exposure to iron ions may be preferentially toxic to cells with high mitochondrial activity [13]. In addition, it is well known that heavy metals do not biologically degrade similar to organic pollutants and could accumulate in living organism's tissues. Thus, their existence in industrial effluents and drinking water is a major public health issue due to their introduction to the food chain by untreated waste discharge into water. Accordingly, more rigorous conditions and standards for the removal and elimination of heavy metals and high salinity from brine in order to discharge them into the environment are mandatory.

Although many processes are commonly applied for the treatment of the brine discharge salinity, such as the zero liquid discharge [14], membrane-based technologies including membrane coagulation [15], forward osmosis [16], reverse osmosis and high-pressure re-verse osmosis [17], osmotically assisted reverse osmosis [18], membrane crystallization [19], different electrodialysis [20-22], as well as thermal-based technologies [23,24], the processes which remove heavy metals from brine are scarce in the literature [25,26]. On the other hand, various methods were used for the treatment of wastewater containing heavy metals, but remediation by adsorption has many advantages, such as the ease of the procedure, high performance, cost effectiveness, and the ability to regenerate/reuse/recycle both adsorbent and adsorbate [27-30]. Accordingly, the search for new types of adsorbents is the main focus of researchers worldwide.

Nanoclays are a modern class of adsorbents composed of nano-dimensional coated mineral silicates that are inexpensive and non-hazardous, and with high surface reactivity and durability. Recently, nanoclays were used as potential adsorbents for heavy metal removal from different aquatic environments [31-34].

Improved nanoclays for the enhanced removal of heavy metals and salt from water are needed.

SUMMARY

Described herein is a modified nanoclay that provides for the enhanced adsorption of heavy metals and salt.

An aspect of the disclosure provides an 8-hydroxyquinoline modified halloysite nanoclay (8-HQHNC). In some embodiments, the 8-hydroxyquinoline comprises 0.5-2 wt % of the 8-HQHNC.

Another aspect of the disclosure provides a method for removing heavy metals and/or salt from a solution, comprising contacting the solution with 8-hydroxyquinoline modified halloysite nanoclay (8-HQHNC) under conditions suitable for the adsorption of the heavy metals and/or salt to the 8-HQHNC; and recovering the 8-HQHNC from the solution. In some embodiments, the solution is wastewater. In some embodiments, the wastewater is desalination brine discharge. In some embodiments, the heavy metals include one or more of Zn, Fe, Ni and Cu. In some embodiments, the step of contacting removes at least 80% of the heavy metals from the solution. In some embodiments, the pH of the solution is maintained between 7-9 during the contacting step.

In further embodiments, the method further comprises removing adsorbed heavy metals and/or salt from the recovered 8-HQHNC to provide a recycled 8-HQHNC. In some embodiments, the method further comprises contacting a solution comprising heavy metals and/or salt with the recycled 8-HQHNC under conditions suitable for adsorption of heavy metals and/or salt to the 8-HQHNC.

DETAILED DESCRIPTION

Figure 1:
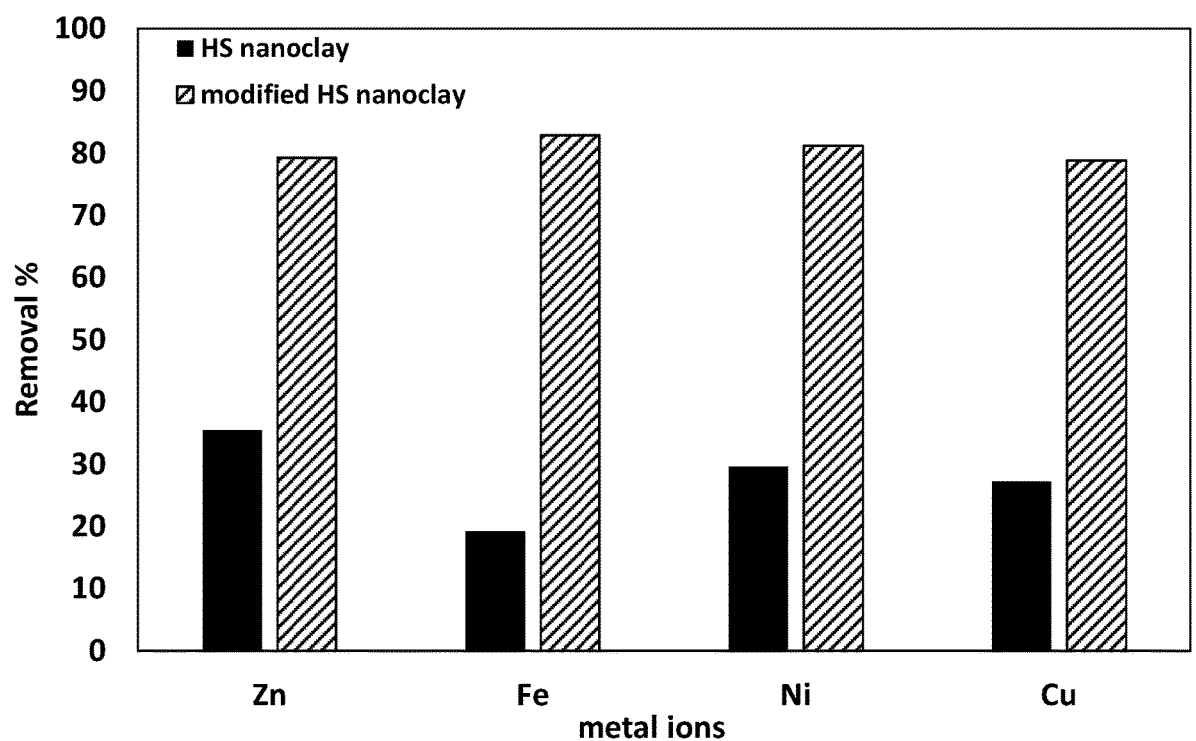
FIG. 1. Percent removal of metal ions from desalination plant outfall brine discharge using HS nanoclay and modified HS nanoclay.

Embodiments of the disclosure provide compositions and methods for the enhanced adsorption/chelation and removal of heavy metals and/or salt from a solution. The compositions comprise a halloysite nanoclay modified with 8-hydroxyquinoline.

Halloysite nanoclay (HNC), also known as kaolin clay, is an aluminosilicate clay mineral with the empirical formula $Al_2Si_2O_5(OH)_4$. Halloysite typically forms by hydrothermal alteration of alumino-silicate minerals. Halloysite naturally occurs as small cylinders (nanotubes) that have a wall thickness of 10-15 atomic aluminosilicate sheets, an outer diameter of 50-60 nm, an inner diameter of 12-15 nm, and a length of 0.5-10 µm. The outer surface is mostly composed of $SiO_2$ and the inner surface of $Al_2O_3$, and hence those surfaces are oppositely charged. Two common forms are found. When hydrated, the clay exhibits a 1 nm spacing of the layers, and when dehydrated (meta-halloysite), the spacing is 0.7 nm. The cation exchange capacity depends on the amount of hydration, as $2H_2O$ has 5-10 meq/100 g, while $4H_2O$ has 40-50 meq/100 g. Owing to the layered structure of the halloysite, it has a large specific surface area, which can reach 117 $m^2/g$. Halloysite is an efficient adsorbent both for cations and anions.

8-hydroxyquinoline (8-HQ), also known as 8-quinolinol or oxine, is a monoprotic, bidentate chelating agent. It is a compound that contains an oxygen donor atom and a nitrogen donor atom that can both bind to metal atoms. In some embodiments, the 8-hydroxyquinoline is present in the modified nanoclay in an amount of about 0.5-2 wt %, e.g. about 1.0 wt % or about 0.01 mg 8-HQ per mg of HNC. In some embodiments, the 8-HQ is on a surface of the nanotubes. In some embodiments, the 8-HQ is embedded in the nanotubes.

Embodiments of the disclosure also include methods of preparing a modified nanoclay as described herein. The 8-HQHNC may be synthesized by adding the HNC to a solution containing 8-HQ and stirring for a period of time, e.g. 1-3 days. Then, the solid nanoclay may be filtered through a 0.45-µm filter membrane and washed with deionized water to remove excess 8-HQ until the filtrate becomes colorless. The final product 8-HQHNC may then be dried, e.g. in an oven at 110° C. overnight.

Embodiments of the disclosure also provide methods for removing heavy metals and/or salt from a solution, e.g. an aqueous solution, using a modified nanoclay as described herein. Exemplary sources of water can be any of a ground water source, an industrial source, a municipal source, water source and/or a combination thereof. In some embodiments, the solution is wastewater which refers to a polluted form of water generated from rainwater runoff and human activities. In some embodiments, the solution is desalination brine discharge from a desalination plant. The term "aqueous solution" encompasses any of the water types as described herein.

The removal method may comprise contacting the solution with 8-HQHNC under conditions suitable for the adsorption of the heavy metals and/or salt to the 8-HQHNC; and recovering the 8-HQHNC from the solution. The removal mechanism is based on the adsorption, chelation, and electrostatic attraction (all terms used interchangeably herein) between 8-HQHNC and the heavy metals and salt.

The solution may comprise at least 50 mg/L of heavy metals, e.g. at least about 100, 200, 300, or 400 mg/L. In some embodiments, the heavy metals include one or more of Zn, Fe, Ni, Cu, Pb, As, Hg, Cd, Ag, Cr, Pd, and Pt. In some embodiments, the step of contacting removes at least 80%, e.g. at least 85%, 90%, or 95% of the heavy metals from the solution.

The solution may be contacted with (e.g. mixed with) the modified nanoclay under conditions suitable for adsorption of heavy metals and salt to the composite. Suitable conditions may include maintaining the solution at a pH of 7 to 9, e.g. about 8. In some embodiments, the solution is maintained at a temperature of 20 to 60° C., e.g. about 25 to 50° C. In some embodiments, the contacting step is performed for 30 to 180 minutes, e.g. about 60 to 120 minutes before recovering the composite from the solution.

The solution may have a salinity ranging from about 0.1 parts per thousand (0.01%) to about 30 parts per thousand (3%) or more. The term "salinity" refers to the dissolved salt content of a body of water. It describes the levels of different salts such as sodium chloride, magnesium and calcium sulfates, and bicarbonates. In some embodiments, the water used in the methods described herein has a salinity of at least 0.01% or more, e.g. at least about 0.1% or more.

The modified nanoclay may be recovered using a filter, e.g. a membrane filter. After recovery, the adsorbed heavy metals and salt may be removed from the modified nanoclay to provide a recycled modified nanoclay that may be reused for adsorbing and removing heavy metals and/or salt from a solution. In some embodiments, the heavy metals and salt are removed using an eluent comprising HCl.

In some embodiments, the modified nanoclay is incorporated into a filter to remove heavy metals from contaminated water. The filter can be designed in a variety of forms, e.g. comprising a candle, a porous block (radial and/or vertical), a filter bed, a packet, a bag, and the like.

Before exemplary embodiments of the present invention are described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

The invention is further described by the following non-limiting examples which further illustrate the invention, and are not intended, nor should they be interpreted to, limit the scope of the invention.

EXAMPLE

Materials and Methods
Study Area

The control as well as the outfall brine discharge sample were collected from the desalination plant at Yanbu city by the Red Sea coast of Saudi Arabia.

Materials

Trimethyl stearyl ammonium surface modified Montmorillonite (TSAM) nanoclay, and Halloysite (HS) nanoclay were purchased from Sigma-Aldrich Canada.

The modification of HS nanoclay was performed using 8-hydroxyquinoline (8-HQ) as follows: 10.0 g of HS nanoclay was added to the saturated solution of 8-HQ and stirred for 2 days, then the solid HS nanoclay was filtered through a 0.45-µm filter membrane and washed with deionized water to remove excess 8-HQ until the filtrate became colorless. The final product 8-hydroxyquinoline HS nanoclay (8-HQ-HS nanoclay) was dried in an oven at 110° C. overnight.

Characterization

Transmission electron microscope (JEOL JEM-1230) was used to examine the morphology of HS nanoclay. X-ray diffraction (XRD) patterns was performed on a Philips X-pert pro® diffractometer. The specific surface area was measured using a NOVA 3200e® automated gas sorption system (Quantachrome, USA).

Adsorption Experiments

Twenty mg of the HS nanoclay was added to 60 ml of the outfall brine discharge sample, then stirred using a stirrer for 90 minutes at 25° C. and at pH 8.0. The solution was filtered and the concentration of the residual heavy metal ions was determined using the stripping voltammetry technique. The removal efficiency of the heavy metal ions by the HS nanoclay was estimated using the following equation:

$$\% \text{ Adsorption} = \frac{(C_o - C_t)}{C_o} \times 100 \qquad (1)$$

$C_0$ and $C_t$ are the concentration of the desired heavy metal in the outfall brine discharge sample (mg m$^{L-1}$), before and after the treatment in mg mL$^{-1}$.

Analytical Measurements

The total metal ion concentration was determined by voltammetric measurement using a Metrohm, 797 VA. The metal ion determination was evaluated by adsorptive cathodic stripping voltammetry (AdCSV). The reagents used for the measurement of Cu were Salicylaldoxime (SA) and boric acid. Dimethylglyoxime (DMG) and boric acid were used for the measurement of Ni and Ammonium pyrrolidine dithiocarabamate (APDC) and boric acid were used for the measurement of Zn. In the case of Fe, 2,4-dihydroxynaphthalene (DHN), HEPES (4-(2-Hydroxyethyl) piperazine-1-ethanesulfonic acid) and potassium bromate were used.

Results

A comparison between HS nanoclay and modified HS nanoclay, for the adsorption and removal of the selected heavy metals from the outfall brine discharge, was performed, and it was found that modified HS nanoclay is much better than HS nanoclay, as the % removal using HS nanoclay was 32.5% for Zn, 19.3% for Fe, 29.7% for Ni and 27.3% for Cu, whereas as in the case of using modified HS nanoclay the % removal reached to 79.3% for Zn, 82.9% for Fe, 81.2% for Ni and 78.9% for Cu (0.33 mg/ml), as it is presented in FIG. 1.

Figure 2:
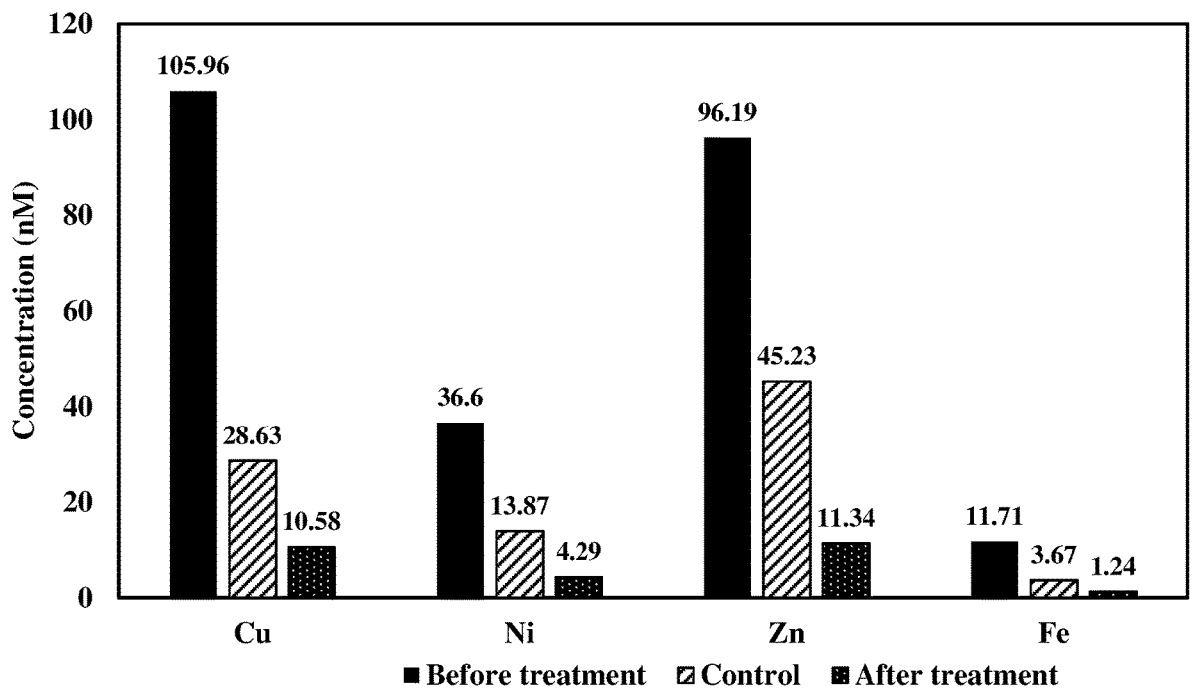
FIG. 2. The variation of metal ions concentration of the desalination plant outfall brine discharge with the treatment by modified HS nanoclay, and its comparison with the control. Experimental conditions: 60.0 ml solution, 90 min adsorption time, 20 mg dosage, and pH 8.0, at 25° C. temperature.

It is important to mention that the treatment of the outfall brine discharge by modified HS nanoclay significantly decreased the concentration of the selected heavy metals below the control sample (the intake of the sea water), which is a great evidence of the applicability of the modified HS nanoclay for the treatment of the desalination plant outfall brine discharge, as it is presented in FIG. 2.

Salinity Removal

The removal of salinity with Halloysite nanoclay and modified HS nanoclay was tested and the removal efficiency was enhanced after the usage of modified nanoclay material. The detailed removal is shown in Table 1.

TABLE 1

| Matrix | Concentration (ppt) HS nanoclay | Concentration (ppt) Modified HS nanoclay |
| --- | --- | --- |
| Control | 42.25 | 42.25 |
| Outfall | 48 | 48 |
| At optimum shaking (90 minutes) | 41.19 | 38.9 |
| At optimum dosage (150 mg/60 ml) | 41.16 (150 mg/60 ml) | 38.8 (20 mg/60 ml) |
| At optimum pH (8) | 41.17 | 39.1 |
| At temperature (50° C.) | 41.28 | 38.5 |

From Table 1, it is clearly evident that the concentration of salt was reduced substantially after the usage of modified HS nanoclay. In all the cases, the salinity concentration was a lower level with respect to the desalination plant outfall brine discharge and control sample of YDP.

The modified Halloysite Nanoclay showed tremendous removal efficiency of heavy metals. The obtained results were compared with control sample and the pattern reflects the lower concentration of salinity with respect to the control. The recycling capacity of the prepared material is significant and the experiments were performed accordingly. In addition, the removal process was explored kinetically, and it was found that the pseudo-second-order model is more suitable for the description of the removal process compared with the pseudo-first-order model. The material showed better recycling ability as well. After the first cycle, the removal efficiency was not changed much. It shows the material can be reused after suitable purification.

The desorption, recycle, regeneration, and reuse experiment for the 8-HQHNC was conducted using 50.0 ml 0.1 M HCl solution for three successive washes, then the solid adsorbent was washed by distilled water until the filtrate reached neutral pH value.

Acknowledgment

The inventors extend their appreciation to the Deputyship for Research & Innovation, Ministry of Education in Saudi Arabia for funding this research work through the project number "2021-064" and King Abdulaziz University, DSR, Jeddah, Saudi Arabia.

REFERENCES

1. United Nations Environment Programme 10 Apr. 2008. Available online: http://www.unep.org/themes/freshwater.html (accessed on).
2. Shatat, M.; Riffat, S. B. Water desalination technologies utilizing conventional and renewable energy sources. Int. J. Low-Carbon Technol. 2012, 9, 1-19, doi:10.1093/ijlct/cts025.
3. Al-Kharabsheh, S. A. Theoretical and Experimental Analysis of Water Desalination System Using Low Grade Solar Heat. Ph.D. Thesis, University of Florida, Gainesville, Fla., USA, 2003.
4. Tiwari, G.; Singh, H.; Tripathi, R. Present status of solar distillation. Sol. Energy 2003, 75, 367-373, doi:10.1016/j.solener.2003.07.005.
5. Li, C.; Goswami, Y.; Stefanakos, E. Solar assisted sea water desalination: A review. Renew. Sustain. Energy Rev. 2013, 19, 136-163, doi:10.1016/j.rser.2012.04.059.
6. Medeazza, G. M.; Moreau, V. Modelling of water-energy systems. The case of desalination. Energy 2007, 32, 1024-1031.
7. Wang, Y.; Lior, N. Proposal and analysis of a high-efficiency combined desalination and refrigeration system based on the LiBr—$H_2O$ absorption cycle—Part 2: Thermal performance analysis and discussions. Energy Conyers. Manag. 2011, 52, 228-235, doi: 10.1016/j.enconman.2010.06.064.
8. WHO/EU Drinking Water Standards Comparative Table. Water Treatment & Air Purification and Other Supporting Information. Available online: http://www.lenntech.Com/WHO-EU-water-standards.html (accessed on 26 Oct. 2007).
9. Panagopoulos, A.; Haralambous, K.-J. Environmental impacts of desalination and brine treatment—Challenges and mitigation measures. Mar. Pollut. Bull. 2020, 161, 111773, doi: 10.1016/j.marpolbul.2020.111773.
10. Cambridge, M. L.; Zavala-Perez, A.; Cawthray, G. R.; Statton, J.; Mondon, J.; Kendrick, G. A. Effects of desalination brine and seawater with the same elevated salinity on growth, physiology and seedling development of the seagrass Posidonia australis. Mar. Pollut. Bull. 2019, 140, 462-471, doi:10.1016/j.marpolbul.2019.02.001. 11. D. G. Barceloux, D. Barceloux, Zinc. J. Toxicol. Clin. Toxicol. 1999, 37, 279-292.
12. Verwilst, P.; Sunwoo, K.; Kim, J. S. The role of copper ions in pathophysiology and fluorescent sensors for the detection thereof. Chem. Commun. 2015, 51, 5556-5571, doi:10.1039/c4cc10366a.
13. Buxton, S.; Garman, E.; Heim, K. E.; Lyons-Darden, T.; Schlekat, C. E.; Taylor, M. D.; Oller, A. R. Concise Review of Nickel Human Health Toxicology and Ecotoxicology. Inorganics 2019, 7, 89.
14. Eaton, J. W.; Qian, M. Molecular bases of cellular iron toxicity12 1 Guest Editor: Mario Comporti 2 This article is part of a series of reviews on "Iron and Cellular Redox Status." The full list of papers may be found on the homepage of the journal. Free Radic. Biol. Med. 2002, 32, 833-840, doi:10.1016/s0891-5849(02)00772-4. 15. Akrami, M.; Salah, A. H.; Dibaj, M.; Porcheron, M.; Javadi, A. A.; Farmani, R.; Fath, H. E. S.; Negm, A. A Zero-Liquid Discharge Model for a Transient Solar-Powered Desalination System for Greenhouse. Water 2020, 12, 1440, doi:10.3390/w12051440.
16. Mohammadtabar, F.; Khorshidi, B.; Hayatbakhsh, A.; Sadrzadeh, M. Integrated Coagulation-Membrane Processes with Zero Liquid Dis-charge (ZLD) Configuration for the Treatment of Oil Sands Produced Water. Water 2019, 11, 1348.
17. Liden, T.; Carlton, D. D.; Miyazaki, S.; Otoyo, T.; Schug, K. A. Forward osmosis remediation of high salinity Permian Basin produced water from unconventional oil and gas development. Sci. Total Environ. 2019, 653, 82-90, doi:10.1016/j.scitotenv.2018.10.325.
18. Davenport, D. M.; Deshmukh, A.; Werber, J. R.; Elimelech, M. High-Pressure Reverse Osmosis for Energy-Efficient Hypersaline Brine Desalination: Current Status, Design Considerations, and Research Needs. Environ. Sci. Technol. Lett. 2018, 5, 467-475, doi:10.1021/acs.estlett.8b00274.
19. Peters, C. D.; Hankins, N. P. Osmotically Assisted Reverse Osmosis (OARO): Five Approaches to Dewatering Saline Brines Using Pres-sure-Driven Membrane Processes. Desalination 2019, 458, 1-13.
20. Curcio, E.; di Profio, G. Chapter 7—Membrane Crystallization. In Current Trends and Future Developments on (Bio-) Membranes Mem-brane Desalination Systems: The Next Generation; 2019; pp. 175-198.
21. Jiang, C.; Wang, Y.; Zhang, Z.; Xu, T. Electrodialysis of concentrated brine from RO plant to produce coarse salt and freshwater. J. Membr. Sci. 2014, 450, 323-330, doi: 10.1016/j.memsci.2013.09.020.
22. Zhao, D.; Lee, L. Y.; Ong, S. L.; Chowdhury, P.; Siah, K. B.; Ng, H. Y. Electrodialysis reversal for industrial reverse osmosis brine treatment. Sep. Purif. Technol. 2019, 213, 339-347, doi:10.1016/j.seppur.2018.12.056.
23. Václavíková, N.; Zich, L.; Doležel, M. Pilot module for electrodialysis-metathesis protected against shunt currents. Desalination Water Treat. 2017, 75, 320-324.
24. Shaffer, D. L.; Chavez, L. H. A.; Ben-Sasson, M.; Castrillón, S. R.-V.; Yip, N.Y.; Elimelech, M. Desalination and Reuse of High-Salinity Shale Gas Produced Water: Drivers, Technologies, and Future Directions. Environ. Sci. Technol. 2013, 47, 9569-9583, doi:10.1021/es401966e.
25. Panagopoulos, A.; Haralambous, K.-J.; Loizidou, M. Desalination brine disposal methods and treatment technologies—A review. Sci. Total. Environ. 2019, 693, 133545, doi:10.1016/j.scitotenv.2019.07.351.
26. Tian, J.; Chang, H.; Gao, S.; Zhang, R. How to fabricate a negatively charged NF membrane for heavy metal removal via the interfacial polymerization between PIP and TMC? Desalination 2020, 491, 114499, doi:10.1016/j.desal.2020.114499.
27. Abdullah, N.; Tajuddin, M. H.; Yusof, N. Forward Osmosis (FO) for Removal of Heavy Metals. In Nanotechnology in Water and Wastewater Treatment; Ahsan, A., Ismail, A. F., Eds.; 2019; pp. 177-204.
28. Ru, J.; Wang, X.; Wang, F.; Cui, X.; Du, X.; Lu, X. UiO series of metal-organic frameworks composites as advanced sorbents for the removal of heavy metal ions: Synthesis, applications and adsorption mechanism. Ecotoxicol. Environ. Saf. 2021, 208, 111577, doi: 10.1016/j.ecoenv.2020.111577.
29. Huang, L.; Liu, R.; Yang, J.; Shuai, Q.; Yuliarto, B.; Kaneti, Y. V.; Yamauchi, Y. Nanoarchitectured porous organic polymers and their environmental applications for removal of toxic metal ions. Chem. Eng. J. 2021, 408, 127991, doi:10.1016/j.cej.2020.127991.

30. Zhang, T.; Wang, W.; Zhao, Y.; Bai, H.; Wen, T.; Kang, S.; Song, G.; Song, S.; Komarneni, S. Removal of heavy metals and dyes by clay-based adsorbents: From natural clays to 1D and 2D nano-composites. Chem. Eng. J. 2020, 29, 127574, doi:10.1016/j.cej.2020.127574.
31. Senguttuvan, S.; Senthilkumar, P.; Janaki, V.; Kamala-Kannan, S. Significance of conducting polyaniline based composites for the re-moval of dyes and heavy metals from aqueous solution and wastewaters—A review. Chemosphere 2021, 267, 129201.
32. Bumanis, G.; Novais, R. M.; Carvalheiras, J.; Bajare, D.; Labrincha, J. A. Metals removal from aqueous solutions by tailored porous waste-based granulated alkali-activated materials. Appl. Clay Sci. 2019, 179, 105147, doi:10.1016/j.clay.2019.105147.
33. Mnasri-Ghnimi, S.; Frini-Srasra, N. Removal of heavy metals from aqueous solutions by adsorption using single and mixed pillared clays. Appl. Clay Sci. 2019, 179, 105151, doi:10.1016/j.clay.2019.105151.
34. Salam, M. A.; Alshehri, A. A.; Schwieger, W.; Mokhtar, M. Removal of bismuth ions utilizing pillared ilerite nanoclay: Kinetic ther-modynamic studies and environmental application. Microporous Mesoporous Mater. 2021, 313, 110826.

While the invention has been described in terms of its preferred embodiments, those skilled in the art will recognize that the invention can be practiced with modification within the spirit and scope of the appended claims. Accordingly, the present invention should not be limited to the embodiments as described above, but should further include all modifications and equivalents thereof within the spirit and scope of the description provided herein.

We claim:
1. A method of removing heavy metals and/or salt from a solution, comprising
   contacting the solution with 8-hydroxyquinoline modified halloysite nanoclay (8-HQHNC) under conditions suitable for the adsorption of the heavy metals and/or salt to the 8-HQHNC, wherein the 8-hydroxyquinoline comprises 0.5-2 wt % of the 8-HQHNC; and
   recovering the 8-HQHNC from the solution, wherein the solution is desalination brine discharge.
2. The method of claim 1, wherein the heavy metals include one or more of Zn, Fe, Ni and Cu.
3. The method of claim 1, wherein the step of contacting removes at least 80% of the heavy metals from the solution.
4. The method of claim 1, wherein the pH of the solution is maintained between 7-9 during the contacting step.
5. The method of claim 1, further comprising removing adsorbed heavy metals and/or salt from the recovered 8-HQHNC to provide a recycled 8-HQHNC.
6. The method of claim 5, further comprising contacting a solution comprising heavy metals and/or salt with the recycled 8-HQHNC under conditions suitable for adsorption of heavy metals and/or salt to the 8-HQHNC.
7. A method of removing salt from a solution, comprising
   contacting the solution with 8-hydroxyquinoline modified halloysite nanoclay (8-HQHNC) under conditions suitable for the adsorption of salt to the 8-HQHNC, wherein the 8-hydroxyquinoline comprises 0.5-2 wt % of the 8-HQHNC; and
   recovering the 8-HQHNC from the solution, wherein the solution is desalination brine discharge.

* * * * *